(12) United States Patent
Baker

(10) Patent No.: US 7,666,309 B1
(45) Date of Patent: Feb. 23, 2010

(54) SPRAYABLE AGRICULTURAL COMPOSITIONS AND METHOD

(76) Inventor: George B. Baker, 30301 Riverview, Junction City, OR (US) 97448

( * ) Notice: Subject to any disclaimer, the term of this patent is extended or adjusted under 35 U.S.C. 154(b) by 485 days.

(21) Appl. No.: 11/702,781

(22) Filed: Feb. 5, 2007

Related U.S. Application Data

(60) Provisional application No. 60/771,290, filed on Feb. 7, 2006.

(51) Int. Cl.
*C02F 5/08* (2006.01)
(52) U.S. Cl. .................... 210/696; 111/118; 111/900; 210/698; 423/562; 504/119
(58) Field of Classification Search .............. 210/696
See application file for complete search history.

(56) References Cited

U.S. PATENT DOCUMENTS

| | | | | |
|---|---|---|---|---|
| 3,335,019 A | * | 8/1967 | Marshall et al. | 106/157.3 |
| 4,243,563 A | * | 1/1981 | Ferm | 524/44 |
| 5,075,332 A | * | 12/1991 | Haglund | 514/476 |
| 5,173,306 A | * | 12/1992 | Green et al. | 424/715 |
| 5,360,782 A | * | 11/1994 | Young et al. | 504/101 |
| 6,589,916 B1 | * | 7/2003 | Feiler et al. | 504/300 |
| 7,063,276 B2 | * | 6/2006 | Newton | 239/302 |
| 7,194,964 B2 | * | 3/2007 | Tidow et al. | 111/118 |

* cited by examiner

*Primary Examiner*—Peter A Hruskoci
(74) *Attorney, Agent, or Firm*—Robert E. Howard

(57) ABSTRACT

A composition including an aqueous solution of calcium polysulfide and an amount of a precipitation preventing compound effective to reduce or eliminate precipitation of the calcium polysulfide at low concentrations. The precipitation preventing compound is selected from the group consisting of sodium hydrosulfide, potassium hydrosulfide, sodium sulfide, and potassium sulfide. A method of reducing or preventing precipitation of calcium polysulfide added to the water in an irrigation system by first injecting the precipitation preventing compound into the water in an amount effective to reduce or eliminate precipitation of the calcium polysulfide at low concentrations. Sodium methyldithiocarbamate can be added to the calcium polysulfide/precipitation preventing compound solution without any substantial precipitation.

8 Claims, No Drawings

SPRAYABLE AGRICULTURAL COMPOSITIONS AND METHOD

CROSS-REFERENCE TO RELATED APPLICATIONS

This application claims the benefit of U.S. Provisional Application No. 60/771,290, filed Feb. 7, 2006.

BACKGROUND OF THE INVENTION

This invention relates to sprayable agricultural compositions, and to a method of reducing or preventing precipitation of calcium polysulfide from an aqueous solution in which it is present in a low concentration.

It is known to apply calcium polysulfide solutions to soil used for agricultural purposes. Calcium polysulfide supplies calcium and colloidal sulfur to the soil, both being crucial plant growing nutrients. In alkaline soil it lowers the pH. It acts as a fungicide, insecticide and a miticide for fruits, nuts, ornamentals, roses, etc.

Calcium polysulfide is applied by adding it to irrigation water or shank injection. However, it cannot be applied through drip or sprinkler irrigation systems because the calcium precipitates and plugs the system.

Sodium methyldithiocarbamate is a common fumigant system used for suppression of nematodes, fungi, bacteria, weeds, weed seeds and volunteer seeds. This material is supplied in aqueous solution, and is applied to agricultural soil after harvest and up to 14 to 21 days before a new crop is planted. It is applied to the field through drip or sprinkler irrigation. However, it cannot be applied together with calcium polysulfide because it would cause the sodium methyldithiocarbamate to precipitate.

SUMMARY OF THE INVENTION

It is an object of the present invention to provide a process which enables calcium polysulfide to be applied to fields through a sprinkler or drip irrigation system.

It is a further object to provide a composition containing calcium polysulfide which can be applied to field through a sprinkler or drip irrigation system.

The composition of the present invention comprises an aqueous solution of calcium polysulfide and an amount of a precipitation preventing compound effective to reduce or eliminate precipitation of the calcium polysulfide at low concentrations. The precipitation preventing compound is selected from the group consisting of sodium hydrosulfide, potassium hydrosulfide, sodium sulfide, and potassium sulfide.

The invention includes a method of reducing or preventing precipitation of calcium polysulfide added to the water in an irrigation system by first injecting the precipitation preventing compound into the water in an amount effective to reduce or eliminate precipitation of the calcium polysulfide at low concentrations.

DESCRIPTION OF PREFERRED EMBODIMENTS

Calcium polysulfide, sometimes called "lime sulfur", has the formula $CaS_x$. It is sold as an aqueous solution containing about 29% by weight calcium polysulfide. The solution contains about 2.2 pounds sulfur per gallon and about 0.6 pounds calcium per gallon. If injected into the water stream of a sprinkler or drip irrigation system, the calcium precipitates out and eventually plugs the relatively small orifices found in sprinkler heads, center pivots, etc. Calcium precipitation has been found to occur at or below about 1% by weight of calcium polysulfide in water.

It has been discovered that if an aqueous solution containing a precipitation preventing compound selected from the group consisting of sodium hydrosulfide and sodium sulfide is present, precipitation can be avoided at calcium polysulfide concentrations in water below about 1%.

Sodium hydrosulfide (sometimes called sodium sulphydrate or "NASH") has the formula $NaSH.2H_2O$ or $NaSHe.3H_2O$.

Potassium hydrosulfide has the formula KSH.

Sodium sulfide has the formula $Na_2S_x$ where x=1, 4, or 5, or $Na_2S.9H_2O$.

Potassium sulfide has the formula $K_2S_x$ where x=1, 2, 3, 4, or 5, or $K_2S.5H_2O$.

Aqueous solutions of the precipitation preventing compounds can be used to prevent calcium precipitation of low concentrations of calcium polysulfide by injecting them into the irrigation water ahead of injecting the calcium polysulfide, or by adding them to the calcium polysulfide aqueous solution before the solution is injected into the irrigation water.

The amount of precipitation preventing compound added to a calcium polysulfide solution is an amount effective to reduce or eliminate precipitation of said calcium polysulfide at low concentrations. The effective amount of the precipitation preventing compound added to the calcium polysulfide aqueous solution is preferably a minimum of about 0.04% by weight of the calcium polysulfide.

It has also been found that sodium methyldithiocarbamate can be contacted with a calcium polysulfide solution containing an effective amount of the precipitation preventing compound and without substantial precipitation. The sodium methyldithiocarbamate can be injected into an irrigation water stream after injection of the precipitation preventing compound, either before or after injection of calcium polysulfide, to prevent precipitation of the sodium methyldithiocarbamate. Alternatively, the sodium methyldithiocarbamate can be added to an aqueous solution of calcium polysulfide containing an effective amount of the precipitation preventing compound.

It will be obvious to those having skill in the art that many changes may be made to the details of the above-described embodiments of this invention without departing from the underlying principles thereof. The scope of the present invention should, therefore, be determined only by the following claims.

The invention claimed is:

1. The method of preventing precipitation of calcium from an aqueous solution containing a concentration of calcium polysulfide at or below about 1% by weight comprising contacting the aqueous solution with an amount of a precipitation preventing compound effective to reduce or eliminate precipitation of said calcium polysulfide, said precipitation preventing compound being selected from the group consisting of sodium hydrosulfide, potassium hydrosulfide, sodium sulfide, and potassium sulfide.

2. The method of claim 1 wherein said precipitation preventing compound is in an aqueous solution.

3. The method of claim 1 wherein said precipitation preventing compound is present in an amount of at least about 0.04% by weight by weight of said calcium polysulfide.

4. The method of claim 1 wherein said precipitation preventing compound is injected into an irrigation water stream followed by injection of said calcium polysulfide solution.

5. The method of claim 1 wherein said precipitation preventing compound is added to an aqueous solution of said calcium polysulfide.

6. The method of claim 1 wherein said precipitation preventing compound is selected from the group consisting of sodium hydrosulfide and potassium hydrosulfide.

7. The method of claim 1 wherein said precipitation preventing compound is selected from the group consisting of sodium sulfide and potassium sulfide.

8. The method of claim 1 wherein sodium methyldithiocarbamate is also present in said aqueous solution.

* * * * *